(12) United States Patent
Kuroda et al.

(10) Patent No.: US 11,002,647 B2
(45) Date of Patent: May 11, 2021

(54) STRESS TEST JIG AND STRESS TEST METHOD

(71) Applicant: Nippon Steel Corporation, Tokyo (JP)

(72) Inventors: Koichi Kuroda, Tokyo (JP); Daisaku Yanaga, Tokyo (JP); Yuhei Suzuki, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 183 days.

(21) Appl. No.: 16/345,050

(22) PCT Filed: Jul. 18, 2017

(86) PCT No.: PCT/JP2017/025994
§ 371 (c)(1),
(2) Date: Apr. 25, 2019

(87) PCT Pub. No.: WO2018/078965
PCT Pub. Date: May 3, 2018

(65) Prior Publication Data
US 2019/0242799 A1    Aug. 8, 2019

(30) Foreign Application Priority Data
Oct. 31, 2016   (JP) .............................. JP2016-213291

(51) Int. Cl.
*G01N 3/04* (2006.01)
*G01N 3/08* (2006.01)

(52) U.S. Cl.
CPC ................. *G01N 3/04* (2013.01); *G01N 3/08* (2013.01); *G01N 2203/0017* (2013.01); *G01N 2203/0019* (2013.01)

(58) Field of Classification Search
CPC .... G01N 3/04; G01N 3/08; G01N 2203/0017; G01N 2203/0019
(Continued)

(56) References Cited

U.S. PATENT DOCUMENTS 3,741,005 A * 6/1973 Dauth ...................... G01N 3/08
                                                      73/831
5,263,373 A   11/1993 Wakabayashi et al.
(Continued)

FOREIGN PATENT DOCUMENTS

CN          1068655 A     2/1993
DE          3912075 A1    10/1990
(Continued)

OTHER PUBLICATIONS

Dec. 24, 2019 (JP) Office Action Application No. 2018-547120.
English machine translation of JP2016-003980.
English machine translation of JP2008-241530.

*Primary Examiner* — Max H Noori
(74) *Attorney, Agent, or Firm* — Banner & Witcoff, Ltd.

(57) ABSTRACT

A stress test the jig 10 includes an upper cylinder 12, a lower cylinder 14, and a frame 16. The frame 16 has an accommodating space 16a, an upper through hole 16b, and a lower through hole 16c. A test specimen 20 is disposed in the accommodating space 16a, the upper cylinder 12 is inserted into the upper through hole 16b, and the lower cylinder 14 is inserted into the lower through hole 16c. The upper cylinder 12 and the lower cylinder 14 fix the test specimen 20 such that the test specimen 20, the upper cylinder 12, and the lower cylinder 14 are positioned coaxially.

4 Claims, 6 Drawing Sheets

(58) Field of Classification Search
USPC .......................................................... 73/856
See application file for complete search history.

(56) References Cited

U.S. PATENT DOCUMENTS

| | | | | |
|---|---|---|---|---|
| 5,279,166 A * | 1/1994 | Ward | ....................... | G01N 3/08 |
| | | | | 73/794 |
| 5,313,841 A * | 5/1994 | Layher | ..................... | G01N 3/04 |
| | | | | 257/E21.53 |
| 2007/0119260 A1* | 5/2007 | Cox | ......................... | G01N 3/08 |
| | | | | 73/820 |
| 2009/0314107 A1 | 12/2009 | Yakimoski et al. | | |
| 2015/0330883 A1 | 11/2015 | Ren et al. | | |
| 2016/0161380 A1* | 6/2016 | Komine | .................. | G01N 3/08 |
| | | | | 73/826 |

FOREIGN PATENT DOCUMENTS

| | | |
|---|---|---|
| JP | S52-119379 A | 10/1977 |
| JP | S59-194044 | 12/1984 |
| JP | S61-102851 U | 6/1986 |
| JP | 4-29858 U | 3/1992 |
| JP | 2008-241530 A | 10/2008 |
| JP | 2011-80918 A | 4/2011 |
| JP | 2015-52563 A | 3/2015 |
| JP | 2016-03980 A | 1/2016 |
| KR | 200477566 Y1 | 6/2015 |

* cited by examiner

[Figure 1]
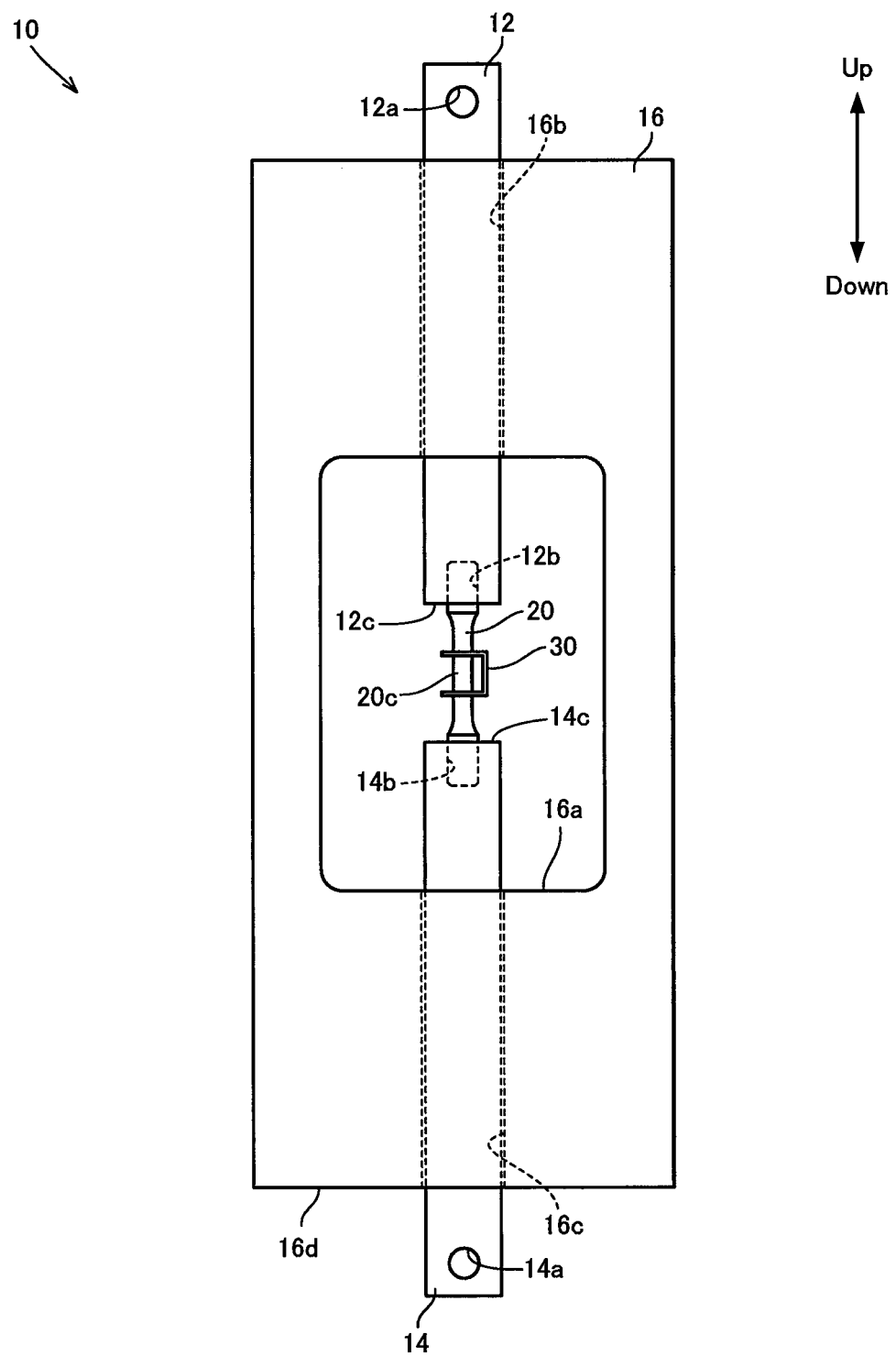

[Figure 2]
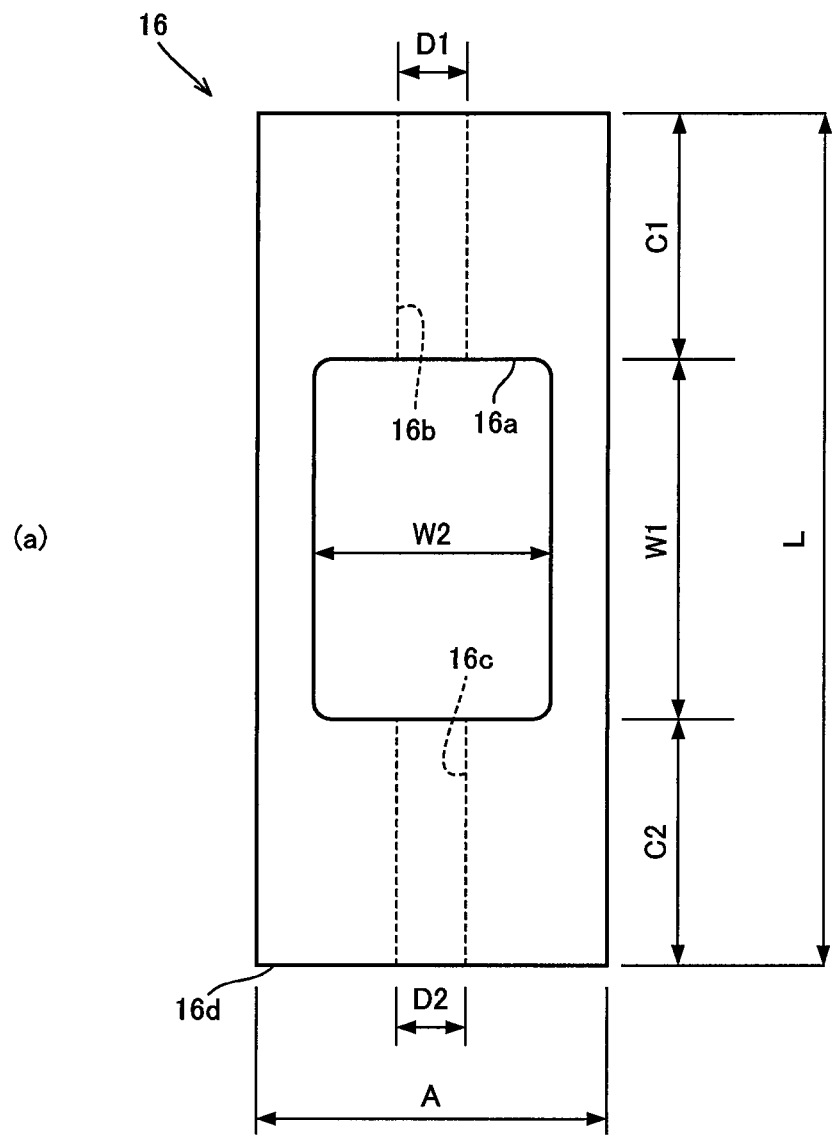
(a)
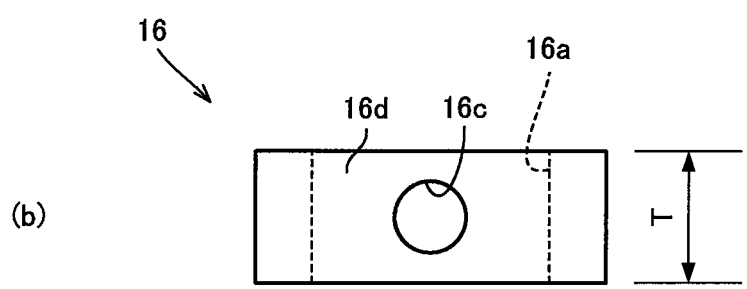
(b)

[Figure 3]
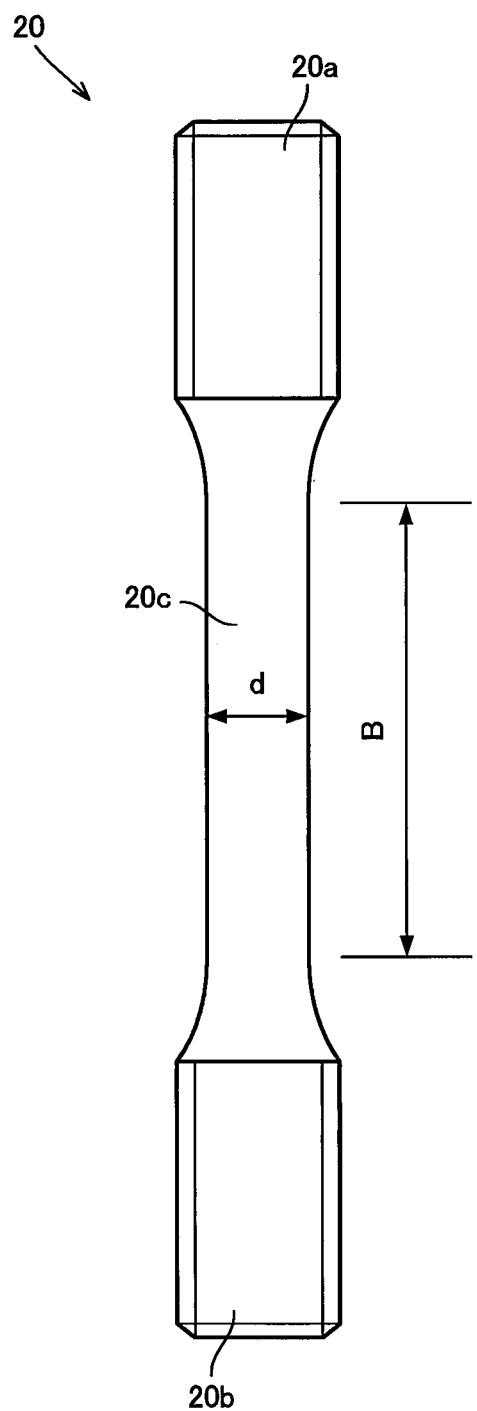

[Figure 4]
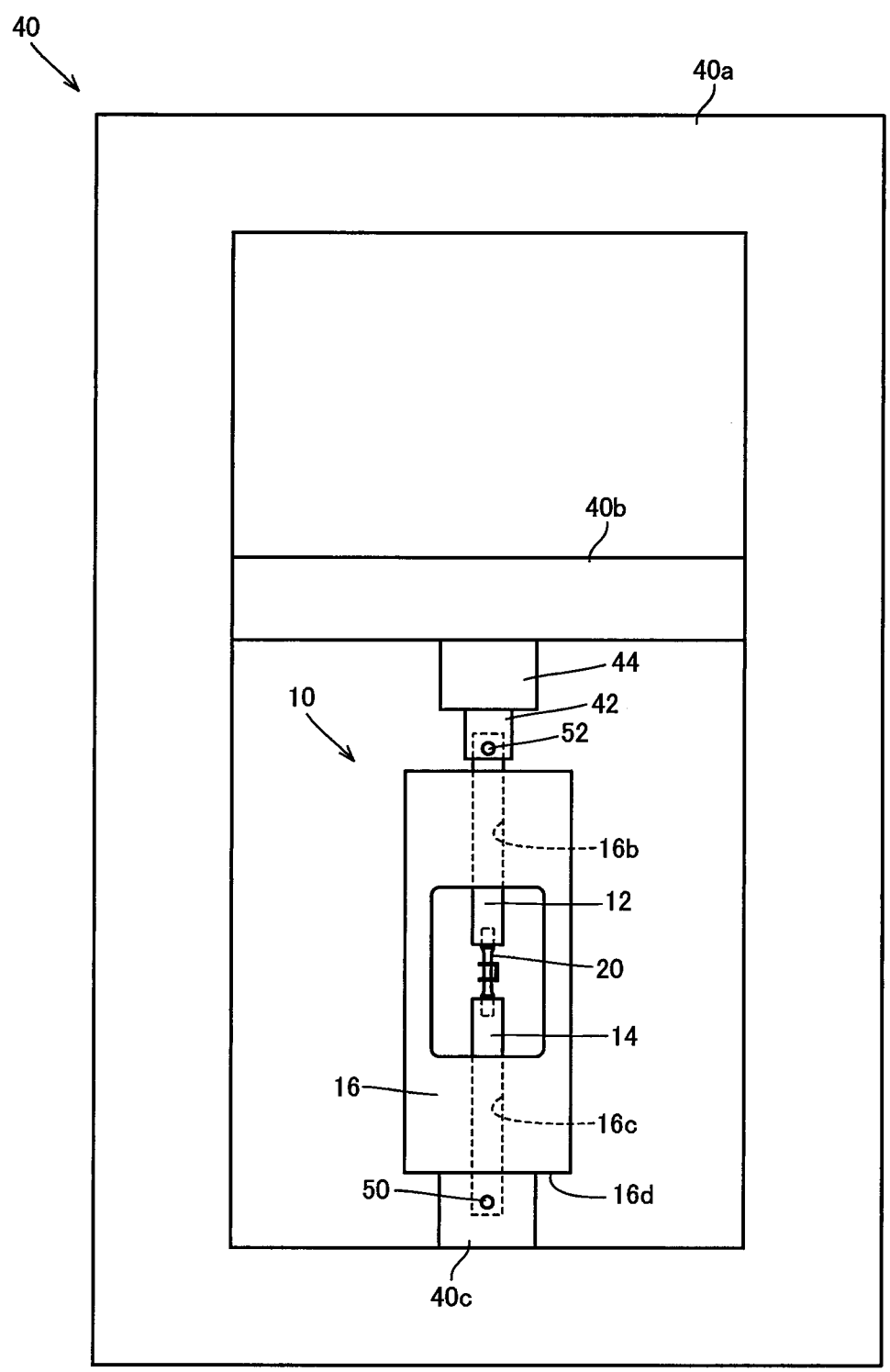

[Figure 5]
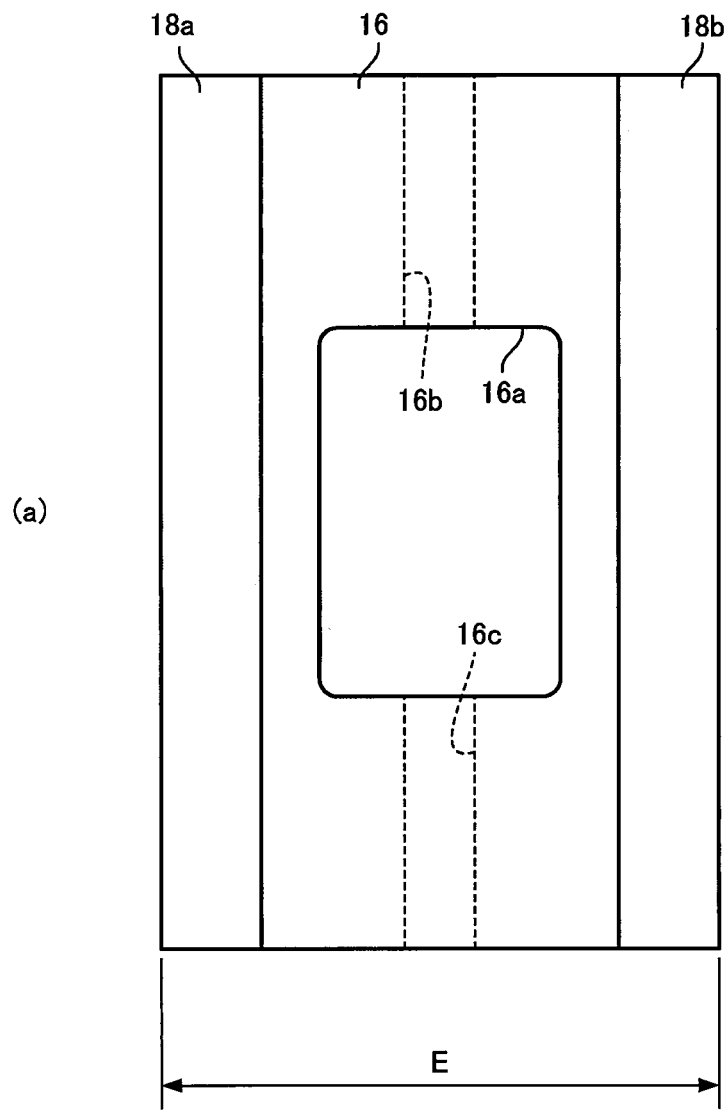
(a)
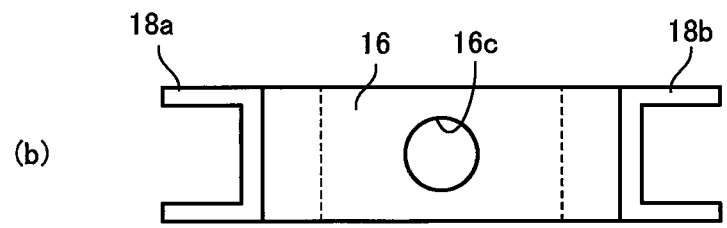
(b)

[Figure 6]
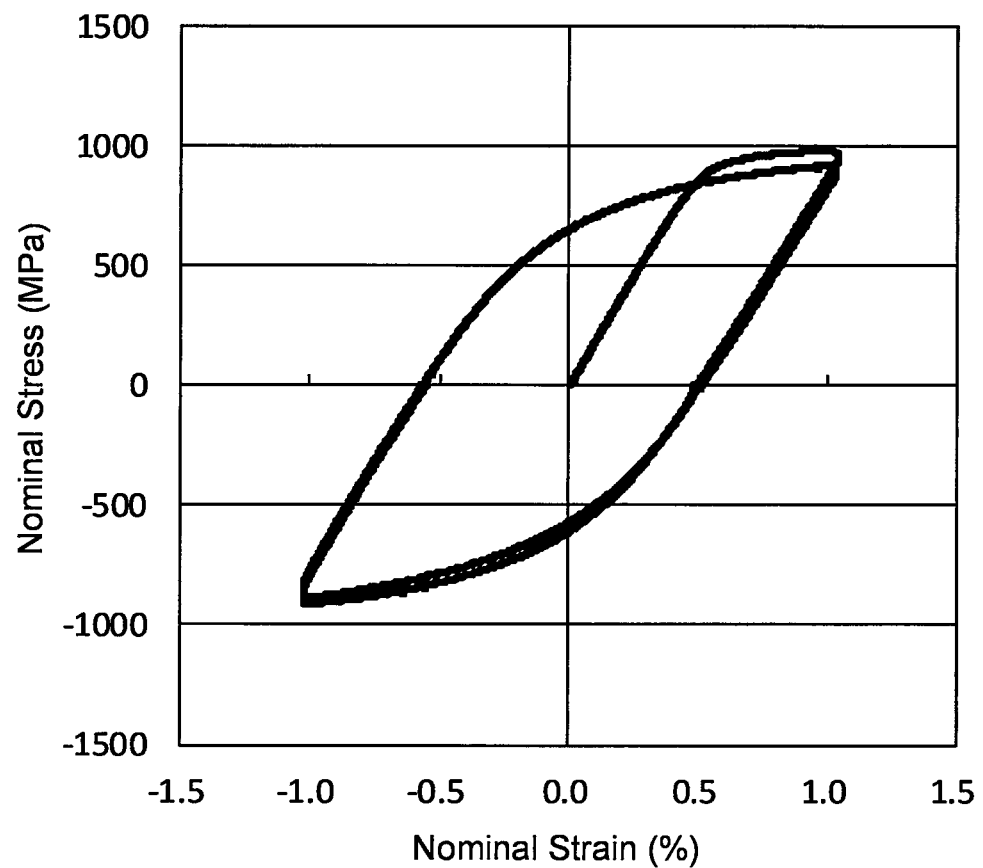

STRESS TEST JIG AND STRESS TEST METHOD

RELATED APPLICATION DATA

This application is a National Stage Application under 35 U.S.C. 371 of co-pending PCT application number PCT/JP2017/025994 designating the United States and filed Jul. 18, 2017; which claims the benefit of JP application number 2016-213291 and filed Oct. 31, 2016 each of which are hereby incorporated by reference in their entireties.

TECHNICAL FIELD

The present invention relates to a stress test jig and a stress test method, and particularly relates to a jig and a test method which can be preferably used in a stress test for a rod-shaped test specimen.

BACKGROUND ART

Oil country tubular goods (OCTG) are used in oil wells and gas wells (in this specification, oil wells and gas wells are collectively referred to as "oil wells"). The oil wells have a corrosive environment. Accordingly, oil country tubular goods are required to have corrosion resistance. Types of oil country tubular goods include a casing and a tubing. The casing is inserted into a well bore. A gap formed between the casing and the wall of the well bore is filled with cement so that the casing is fixed in the well bore. The tubing is inserted into the casing, and a production fluid, such as oil and gas, passes through the tubing. The oil country tubular goods are also required to have high strength together with corrosion resistance. In general, the strength grade of oil country tubular goods is defined by tensile yield strength in an axial direction of the oil country tubular goods. A user of oil country tubular goods performs trial drilling, geological surveys and the like so as to investigate the environment (formation pressure, the temperature of a production fluid, and pressure of the production fluid) of a well to be drilled, and selects oil country tubular goods with a sufficiently durable strength grade. Recently, wells have become deeper and hence, oil country tubular goods are required to have not only high tensile yield strength but also high compressive yield strength. Accordingly, tests are performed on oil country tubular goods in advance so as to understand deformation behavior of the oil country tubular goods when tensile stress or compressive stress is generated.

As the test for understanding deformation behavior of steel products when compressive stress is generated, for example, a compression test which is defined by ASTM E9-09 may be used. In this compression test, an upper end face and a lower end face of a test specimen having a columnar shape is pressed by a flat compression jig. With such an operation, compressive stress can be generated in the test specimen.

However, in a compression test of steel products, buckling in a test specimen causes a problem. For example, in the above-mentioned compression test defined by ASTM E9-09, if the flatness of a pressing surface of the compression jig which presses a test specimen is reduced, the pressing direction of the compression jig may tilt with respect to the axial direction of the test specimen. Such tilting may cause buckling in the test specimen.

In view of the above, a jig for preventing the above-mentioned buckling is proposed. For example, Patent Document 1 discloses a stress test jig which includes: a flange which holds an upper end portion of a test specimen (hereinafter referred to as "upper flange"); a flange which holds a lower end portion of the test specimen (hereinafter referred to as "lower flange"); an upper fixing member to which the upper flange is fixed; a lower fixing member to which the lower flange is fixed; and two guide members which penetrate the upper fixing member in the vertical direction.

In the stress test jig disclosed in Patent Document 1, the upper flange moves upward and downward by moving the upper fixing member upward and downward. Such movement can generate compressive stress or tensile stress in the test specimen held by the upper flange. Further, in the stress test jig disclosed in Patent Document 1, the upper fixing member can be moved upward and downward along the guide members and hence, it is possible to prevent the upper fixing member from tilting when the upper fixing member moves upward and downward. Accordingly, it is possible to prevent the upper flange, which is fixed to the guide members, from tilting and hence, it is possible to prevent a loading direction of a compressive load and a tensile load on the test specimen from tilting with respect to the axial direction of the test specimen. As a result, occurrence of buckling can be suppressed.

Patent Document 2 discloses a jig for preventing buckling in a compression test specimen. In the jig disclosed in Patent Document 2, a parallel portion of the test specimen is surrounded by a plurality of members, thus preventing the generation of bends on the parallel portion.

LIST OF PRIOR ART DOCUMENTS

Patent Document

Patent Document 1: JP2008-241530A
Patent Document 2: JP61-102851U

SUMMARY OF INVENTION

Technical Problem

However, when the jig disclosed in Patent Document 1 is used, the upper flange which holds the upper end portion of the test specimen is required to be fixed to the upper fixing member by screws or the like. Accordingly, without sufficient improvement of assembly accuracy between the upper flange and the upper fixing member, even though the guide member suppresses tilting of the upper fixing member, the upper flange may tilt. Therefore, there may be a case where the loading direction of a compressive load and a tensile load on the test specimen tilts, so that occurrence of buckling cannot be sufficiently suppressed.

On the other hand, the jig disclosed in Patent Document 2 is configured so as to surround the parallel portion of the test specimen as described above. Accordingly, when the jig disclosed in Patent Document 2 is used, an extensometer for measuring elongation of the parallel portion cannot be attached to the parallel portion. In this case, the relationship between stress and strain which are generated in the test specimen cannot be investigated with high accuracy. That is, the relationship between stress and strain in metal products cannot be properly evaluated.

Further, in the configuration disclosed in Patent Document 2, the parallel portion of the test specimen may contact to the jig. In this case, a force is applied to the parallel portion from the jig due to a contact of the parallel portion of the test specimen to the jig and hence, the relationship between stress and strain cannot be investigated with high accuracy.

The present invention has been made to solve such problems, and it is an objective of the present invention to provide a stress test jig and a stress test method which can suppress buckling in test specimen without covering an area around the parallel portion.

Solution to Problem

The gist of the present invention is the following stress test jig and stress test method.

(1) A stress test jig which is used in a stress testing machine, the stress testing machine applying at least one of a compressive load and a tensile load to a rod-shaped test specimen which is disposed so as to extend in a vertical direction, the stress test jig including:

an upper cylinder configured to allow an upper end portion of the test specimen to be fixed to a lower end portion of the upper cylinder;

a lower cylinder configured to allow a lower end portion of the test specimen to be fixed to an upper end portion of the lower cylinder; and a frame configured to allow insertion of the upper cylinder and the lower cylinder, wherein the upper cylinder and the lower cylinder allow the test specimen to be fixed such that the test specimen, the upper cylinder, and the lower cylinder are positioned coaxially, and the frame includes: an accommodating space penetrating the frame in a horizontal direction, and capable of accommodating the test specimen; an upper through hole extending upward from the accommodating space so as to penetrate the frame, and allowing insertion of the upper cylinder; and a lower through hole extending downward from the accommodating space so as to penetrate the frame coaxially with the upper through hole, and allowing insertion of the lower cylinder.

(2) The stress test jig according to the above-mentioned (1), wherein the stress testing machine includes: a crosshead provided in a movable manner in a vertical direction; and a support portion provided below the crosshead, the frame has a flat surface provided below the accommodating space, and supported by the support portion of the stress testing machine, an upper end portion of the upper cylinder is formed so as to be connectable to the crosshead, and a lower end portion of the lower cylinder is formed so as to be connectable to the support portion.

(3) The stress test jig according to the above-mentioned (1) or (2), wherein the lower end portion of the upper cylinder is configured to allow the upper end portion of the test specimen to be fixed by screwing the upper end portion of the test specimen into the lower end portion of the upper cylinder, and the upper end portion of the lower cylinder is configured to allow the lower end portion of the test specimen to be fixed by screwing the lower end portion of the test specimen into the upper end portion of the lower cylinder.

(4) A stress test method where at least one of a compressive load and a tensile load is applied to a rod-shaped test specimen using a stress testing machine, the stress testing machine including a crosshead provided in a movable manner in a vertical direction and a support portion provided below the crosshead, the stress test method including:

mounting the test specimen on the stress test jig described in any one of the above-mentioned (1) to (3) which is disposed on the support portion, and connecting the crosshead to the upper cylinder of the stress test jig; and applying at least one of the compressive load and the tensile load to the test specimen by moving the crosshead in the vertical direction.

Advantageous Effects of Invention

According to the present invention, buckling in a test specimen can be suppressed without covering an area around the parallel portion. Accordingly, the relationship between stress and strain in metal products can be properly evaluated.

BRIEF DESCRIPTION OF DRAWINGS

FIG. 1 is a front view showing a stress test jig according to one embodiment of the present invention.

FIG. 2 is a view showing a frame, wherein FIG. 2(a) is a front view, and FIG. 2(b) is a bottom view.

FIG. 3 is a view showing one example of a test specimen.

FIG. 4 is a view showing a stress testing machine to which a jig is attached.

FIG. 5 is a view showing a frame to which gripping members are attached, wherein FIG. 5(a) is a front view, and FIG. 5(b) is a bottom view.

FIG. 6 is a view showing an investigation result (relationship between stress and strain) in an example.

DESCRIPTION OF EMBODIMENTS

Hereinafter, a stress test jig and a stress test method which uses the stress test jig according to one embodiment of the present invention are described in detail. As described later, the stress test jig according to this embodiment is used in a stress testing machine which can apply at least one of a compressive load and a tensile load to a rod-shaped test specimen which is disposed so as to extend in the vertical direction.

FIG. 1 is a front view showing a stress test jig according to one embodiment of the present invention. Referring to FIG. 1, the stress test jig 10 according to this embodiment (hereinafter described as "jig 10") includes an upper cylinder 12, a lower cylinder 14, and a frame 16. The upper cylinder 12, the lower cylinder 14 and the frame 16 are respectively made of metal, for example.

The upper cylinder 12 has a columnar shape or a cylindrical shape, for example. A through hole 12a is formed in an upper end portion of the upper cylinder 12, and the through hole 12a penetrates the upper cylinder 12 in a radial direction. A connecting pin 52 described later (see FIG. 4) is to be inserted into the through hole 12a. A screw hole 12b is formed in a lower end portion of the upper cylinder 12. The screw hole 12b is formed so as to extend upward from a lower surface 12c of the upper cylinder 12 such that the screw hole 12b opens on the lower surface 12c of the upper cylinder 12.

The lower cylinder 14 has a columnar shape or a cylindrical shape, for example. A through hole 14a is formed at a lower end portion of the lower cylinder 14, and the through hole 14a penetrates the lower cylinder 14 in a radial direction. A connecting pin 50 described later (see FIG. 4) is to be inserted into the through hole 14a. A screw hole 14b is formed at an upper end portion of the lower cylinder 14. The screw hole 14b is formed so as to extend downward from an upper surface 14c of the lower cylinder 14 such that the screw hole 14b opens on the upper surface 14c of the lower cylinder 14.

FIG. 2 is a view showing the frame 16, wherein FIG. 2(a) is a front view, and FIG. 2(b) is a bottom view. Referring to FIG. 1 and FIG. 2, the frame 16 has a closed cross sectional shape. In this embodiment, the frame 16 has an accommodating space 16a, an upper through hole 16b, a lower through hole 16c, and a flat surface 16d provided below the accommodating space 16a.

The accommodating space 16a is formed so as to penetrate the frame 16 in a horizontal direction. In other words, the accommodating space 16a is a through hole which penetrates the frame 16 in the horizontal direction. In this embodiment, the accommodating space 16a has a substantially rectangular shape as viewed in a front view, and is formed at the center portion of the frame 16. A test specimen 20 described later is accommodated in the accommodating space 16a.

A length W1 of the accommodating space 16a in the vertical direction is set to 100 mm or more and 200 mm or less, for example. Setting the length W1 to 100 mm or more improves workability in mounting the test specimen 20 described later on the jig 10, and workability in attaching an extensometer 30 described later on the test specimen 20. Further, setting the length W1 to 200 mm or less more effectively suppresses buckling in the test specimen 20. As viewed in a front view, the width W2 of the accommodating space 16a in the horizontal direction is set to approximately 100 mm, for example.

Referring to FIG. 1 and FIG. 2, the upper through hole 16b and the lower through hole 16c are formed so as to penetrate the frame 16. To be more specific, the upper through hole 16b is formed so as to extend upward from the accommodating space 16a, and the lower through hole 16c is formed so as to extend downward from the accommodating space 16a. The upper through hole 16b and the lower through hole 16c are formed coaxially with each other.

On cross sections of the frame 16 which extend in the horizontal direction (that is, cross sections perpendicular to the vertical direction), the upper through hole 16b and the lower through hole 16c respectively have a circular shape. Referring to FIG. 1, the upper cylinder 12 is inserted into the upper through hole 16b, and the lower cylinder 14 is inserted into the lower through hole 16c. Each of a clearance between the upper through hole 16b and the upper cylinder 12 and a clearance between the lower through hole 16c and the lower cylinder 14 is set to 0.3 mm or less, for example, and is preferably set to 0.1 mm or less.

Referring to FIG. 2, it is preferable to set a length C1 of the upper through hole 16b in the vertical direction and a diameter D1 of the upper through hole 16b so as to satisfy the following formula (1). It is preferable to set a length C2 of the lower through hole 16c in the vertical direction and a diameter D2 of the lower through hole 16c so as to satisfy the following formula (2). It is more preferable to set the length C1 and the diameter D1 so as to satisfy the following formula (3). It is more preferable to set the length C2 and the diameter D2 so as to satisfy the following formula (4).

$$C1/D1 \geq 1.1 \tag{1}$$

$$C2/D2 \geq 1.1 \tag{2}$$

$$C1/D1 \geq 3.0 \tag{3}$$

$$C2/D2 \geq 3.0 \tag{4}$$

In this embodiment, the frame 16 has a rectangular shape as viewed in a front view. A length L of the frame 16 in the vertical direction is set to approximately 550 mm, for example. A width A of the frame 16 in the horizontal direction is set to approximately 130 mm, for example. A thickness T of the frame 16 is set to approximately 50 mm, for example.

FIG. 3 is a view showing one example of a test specimen to be mounted on the jig 10. As shown in FIG. 3, in this embodiment, the test specimen 20 having a rod shape (round bar) is used. A screw groove is formed on each of an upper end portion 20a and a lower end portion 20b of the test specimen 20. From the viewpoint of suppressing buckling in the test specimen 20, it is preferable to set a length B of a parallel portion 20c and a diameter d of the parallel portion 20c so as to satisfy the following formula (5), for example.

$$2.5 \leq B/d \leq 3.5 \tag{5}$$

Referring to FIG. 1 and FIG. 3, in this embodiment, the upper end portion 20a of the test specimen 20 is screwed into the screw hole 12b of the upper cylinder 12, and the lower end portion 20b of the test specimen 20 is screwed into the screw hole 14b of the lower cylinder 14. With such a configuration, the upper cylinder 12 and the lower cylinder 14 are fixed to the test specimen 20. In this embodiment, the upper cylinder 12 and the lower cylinder 14 fix the test specimen 20 such that the test specimen 20, the upper cylinder 12, and the lower cylinder 14 are positioned coaxially. The extensometer 30 is attached to the parallel portion 20c of the test specimen 20, and the extensometer 30 measures elongation of the parallel portion 20c in a stress test described later. A variety of known extensometers may be used as the extensometer 30, so that the detailed description of the extensometer 30 is omitted.

Next, a stress test method using the above-mentioned jig 10 is described. FIG. 4 is a view showing a stress testing machine used in performing the stress test method according to this embodiment. A variety of known testing machines may be used as the stress testing machine, so that the stress testing machine is described simply.

Referring to FIG. 4, the stress testing machine 40 used in the stress test method according to this embodiment includes a body portion 40a, a crosshead 40b extending in the horizontal direction and supported on the body portion 40a in a movable manner in the vertical direction, and a support rod 40c provided below the crosshead 40b. The crosshead 40b is moved upward and downward by a driving device not shown in the drawing. In this embodiment, the support rod 40c corresponds to a support portion which supports the flat surface 16d of the frame 16.

In performing the stress test, for example, the frame 16 of the jig 10, on which the test specimen 20 is mounted as described above, is mounted on the stress testing machine 40. To be more specific, the jig 10 is installed such that the flat surface 16d of the frame 16 is supported on the upper surface of the support rod 40c. In this embodiment, the frame 16 is supported on the support rod 40c of the stress testing machine 40 by the dead weight of the frame 16. In a state where the upper cylinder 12 and the lower cylinder 14 are not in contact with the frame 16, there is no possibility of a downward load being applied to the frame 16 from the stress testing machine 40 (crosshead 40b).

Although the detailed description is omitted, the support rod 40c is formed so as to allow insertion of the lower end portion of the lower cylinder 14. In this embodiment, the support rod 40c and the lower cylinder 14 are connected with each other by the connecting pin 50.

The upper end portion of the upper cylinder 12 is inserted into a connecting rod 42, and is connected to the connecting rod 42 by the connecting pin 52. The connecting rod 42 is mounted on the crosshead 40b by way of a load cell 44. With such a configuration, the upper cylinder 12 and the crosshead 40b are connected with each other.

By moving the crosshead 40b upward and downward in a state where the test specimen 20 is mounted on the jig 10, and the crosshead 40b is connected to the upper cylinder 12 as described above, a compressive load and a tensile load can be applied to the test specimen 20.

As described above, when the jig 10 according to this embodiment is used, the upper cylinder 12 which is moved upward and downward by the crosshead 40b, the test specimen 20 which is fixed to the upper cylinder 12, and the lower cylinder 14 which supports the test specimen 20 can be coaxially arranged. Further, even if the upper cylinder 12 and the lower cylinder 14 begin to tilt, during a stress test, in a direction that may cause buckling in the test specimen 20, the frame 16 prevents the upper cylinder 12 and the lower cylinder 14 from tilting significantly. To be more specific, the upper cylinder 12 and the lower cylinder 14 come into contact with the frame 16 in the upper through hole 16b and the lower through hole 16c, thus preventing the upper cylinder 12 and the lower cylinder 14 from tilting significantly. Accordingly, in this embodiment, even without sufficiently improving assembly accuracy between the upper cylinder 12 and the crosshead 40b, it is possible to prevent the upper cylinder 12 and the lower cylinder 14 from tilting with respect to the vertical direction. As a result, it is possible to prevent a loading direction of a compressive load and a tensile load on the test specimen 20 from tilting with respect to the vertical direction and hence, occurrence of buckling in the test specimen 20 can be sufficiently suppressed.

Further, as described above, it is unnecessary to improve assembly accuracy between the upper cylinder 12 and the crosshead 40b more than necessary and hence, a connection structure between the upper cylinder 12 and the crosshead 40b can be simplified. In this embodiment, as described above, the upper cylinder 12 and the crosshead 40b can be connected to each other with a simple configuration which uses the connecting pin 52. Accordingly, compared to a configuration disclosed in Patent Document 1 where an upper flange and a crosshead are required to connect with each other using a plurality of screws, attaching of the jig 10 to and mounting of the test specimen 20 on the stress testing machine 40 can be facilitated.

In this embodiment, it is unnecessary to cover an area around the parallel portion 20c of the test specimen 20 by the jig 10 and hence, the extensometer 30 can be attached to the parallel portion 20c. Further, there is no possibility of the parallel portion 20c and the jig 10 coming into contact with each other. As a result, the relationship between stress and strain which are generated in the test specimen 20 can be investigated with high accuracy.

Although the detailed description is omitted, for example, as shown in FIG. 5, to facilitate carrying of the frame 16, gripping members 18a, 18b having a C shape as viewed in a plan view may be respectively provided to both side surfaces of the frame 16. In this case, a width E is set to approximately 200 mm, for example. A C-shaped steel section may be used for each of the gripping members 18a, 18b, for example.

EXAMPLE

To check advantageous effects of the present invention, using a jig 10 and a stress testing machine 40 having the above-mentioned configuration, a compressive load and a tensile load were repeatedly applied to a test specimen 20 so as to investigate the relationship between stress and strain which are generated in the test specimen 20.

In this example, a frame 16 provided with C-shaped steel sections 18a, 18b (see FIG. 5) was used. Referring to FIG. 2, each of a length C1 and a length C2 was set to 200 mm, a length W1 was set to 150 mm, a width W2 was set to 100 mm, a width A was set to 130 mm, a thickness T was set to 50 mm, each of a diameter D1 and a diameter D2 was set to 32 mm, and a width E (see FIG. 5) was set to 200 mm. Further, referring to FIG. 3, in the axial direction of the test specimen 20, each of a length of an upper end portion 20a and a length of a lower end portion 20b was set to 6.3 mm, a length B of a parallel portion 20c was set to 8.0 mm, a diameter d was set to 2.5 mm, and an overall length of the test specimen 20 was set to 25.5 mm. Referring to FIG. 1, each of a clearance between an upper through hole 16b and an upper cylinder 12 and a clearance between a lower through hole 16c and a lower cylinder 14 was 0.1 mm.

The relationship between stress and strain (hysteresis curve) obtained by the investigation is shown in FIG. 6. In this example, buckling in the test specimen 20 did not occur during the test. That is, according to the present invention, it is understood that the relationship between stress and strain can be properly evaluated while occurrence of buckling is prevented.

INDUSTRIAL APPLICABILITY

According to the present invention, buckling in a test specimen can be suppressed without covering an area around a parallel portion. Accordingly, the relationship between stress and strain in metal products can be properly evaluated.

REFERENCE SIGNS LIST 10 stress test jig
12 upper cylinder
14 lower cylinder
16 frame
16a accommodating space
16b upper through hole
16c lower through hole
16d flat surface
20 test specimen
30 extensometer
40 stress testing machine

The invention claimed is:

1. A stress test jig which is used in a stress testing machine, the stress testing machine applying at least one of a compressive load and a tensile load to a rod-shaped test specimen which is disposed so as to extend in a vertical direction, the stress test jig comprising:
 an upper cylinder configured to allow an upper end portion of the test specimen to be fixed to a lower end portion of the upper cylinder;
 a lower cylinder configured to allow a lower end portion of the test specimen to be fixed to an upper end portion of the lower cylinder; and
 a frame configured to allow insertion of the upper cylinder and the lower cylinder, wherein
 the upper cylinder and the lower cylinder allow the test specimen to be fixed such that the test specimen, the upper cylinder, and the lower cylinder are positioned coaxially, the frame includes: an accommodating space penetrating the frame in a horizontal direction, and capable of accommodating the test specimen; an upper through hole extending upward from the accommodating space so as to penetrate the frame, and allowing insertion of the upper cylinder; and a lower through hole extending downward from the accommodating space so as to penetrate the frame coaxially with the upper through hole, and allowing insertion of the lower cylinder, the upper cylinder is inserted into the upper through hole so as to protrude upward from the frame, and the lower cylinder is inserted into the lower through hole so as to protrude downward from the frame.

2. The stress test jig according to claim 1, wherein the stress testing machine includes: a crosshead provided in a movable manner in a vertical direction; and a support portion provided below the crosshead, the frame has a flat surface provided below the accommodating space, and supported by the support portion of the stress testing machine, an upper end portion of the upper cylinder is formed so as to be connectable to the crosshead, and a lower end portion of the lower cylinder is formed so as to be connectable to the support portion.

3. The stress test jig according to claim 1, wherein the lower end portion of the upper cylinder is configured to allow the upper end portion of the test specimen to be fixed by screwing the upper end portion of the test specimen into the lower end portion of the upper cylinder, and the upper end portion of the lower cylinder is configured to allow the lower end portion of the test specimen to be fixed by screwing the lower end portion of the test specimen into the upper end portion of the lower cylinder.

4. A stress test method where at least one of a compressive load and a tensile load is applied to a rod-shaped test specimen using a stress testing machine, the stress testing machine including a crosshead provided in a movable manner in a vertical direction and a support portion provided below the crosshead, the stress test method comprising:

mounting the test specimen on the stress test jig described in claim 1 which is disposed on the support portion, and connecting the crosshead to the upper cylinder of the stress test jig; and applying at least one of the compressive load and the tensile load to the test specimen by moving the crosshead in the vertical direction.

\* \* \* \* \*